United States Patent [19]
Thatcher et al.
[11] Patent Number: 4,674,286
[45] Date of Patent: Jun. 23, 1987

[54] SONIC DISPERSION UNIT AND CONTROL SYSTEM THEREFOR

[75] Inventors: Arthur K. Thatcher, P.O. Box 352, Merritt Island, Fla. 32952; Ed R. McCarter, deceased, late of Maitland, Fla., by Rebecca A. McCarter, executrix

[73] Assignee: Arthur K. Thatcher, Merritt Island, Fla.

[21] Appl. No.: 723,837

[22] Filed: Apr. 16, 1985

Related U.S. Application Data

[60] Division of Ser. No. 351,536, Feb. 23, 1982, Pat. No. 4,520,786, which is a continuation-in-part of Ser. No. 118,451, Feb. 4, 1980, Pat. No. 4,317,440, which is a division of Ser. No. 868,825, Jan. 12, 1978, Pat. No. 4,231,333, which is a continuation-in-part of Ser. No. 593,001, Jul. 3, 1975, Pat. No. 4,100,896, which is a division of Ser. No. 293,377, Sep. 29, 1972, Pat. No. 3,893,434.

[51] Int. Cl.[4] .......... F02C 1/00; F02G 3/00
[52] U.S. Cl. .......... 60/740; 60/734
[58] Field of Search .......... 60/734, 737, 740; 123/536, 537, 590; 261/DIG. 48; 239/102; 431/1

[56] References Cited

U.S. PATENT DOCUMENTS

| | | | |
|---|---|---|---|
| 2,908,443 | 10/1959 | Fruengel | 261/DIG. 48 |
| 3,114,654 | 12/1963 | Nishiyama et al. | 239/102 |
| 3,123,305 | 3/1964 | Eisenkraft | 239/102 |
| 3,155,141 | 11/1964 | Doyle et al. | 239/102 |
| 3,166,900 | 1/1965 | Stegen | 60/39.03 |
| 3,292,910 | 12/1966 | Martner | 239/102 |
| 3,357,641 | 12/1967 | Martner | 239/102 |
| 3,375,977 | 4/1968 | Butterworth et al. | 239/102 |
| 3,381,895 | 5/1968 | Thomas | 239/102 |
| 3,700,170 | 10/1972 | Blanka et al. | 239/102 |
| 3,756,575 | 9/1973 | Cottell | 239/102 |
| 3,860,173 | 1/1975 | Sata | 239/102 |
| 4,100,896 | 7/1978 | Thatcher et al. | 123/537 |
| 4,520,786 | 6/1985 | Thatcher et al. | 123/536 |

OTHER PUBLICATIONS

Lefebvre, Arthur H., *Gas Turbine Combustion,* 1983, pp. 371–372.

*Primary Examiner*—Carlton R. Croyle
*Assistant Examiner*—Timothy S. Thorpe
*Attorney, Agent, or Firm*—Sixbey, Friedman & Leedom

[57] ABSTRACT

The sonic dispersion system includes a sonic dispersion unit (18) mounted upon a mounting assembly (100,102) and having an active surface (116) with a central apex (120) positioned in spaced relationship to the mounting assembly. Material directing units (92,94) direct material against the active surface so that the material is redirected thereby toward the apex. The sonic dispersion unit (18) may be used in combination with a control system (10) which controls the amount of material provided from two separate material sources (14,34).

16 Claims, 13 Drawing Figures

SONIC DISPERSION UNIT AND CONTROL SYSTEM THEREFOR

RFERENCE TO RELATED APPLICATIONS

This application is a divisional of Ser. No. 351,536, filed Feb. 23, 1982 now U.S. Pat. No. 4,520,786 which is a continuation-in-part of Ser. No. 118,451, filed Feb. 4, 1980, now U.S. Pat. No. 4,317,440 which is a division of Ser. No. 868,825, filed Jan. 12, 1978, now U.S. Pat. No. 4,231,333; which is a continuation-in-part of application Ser. No. 593,001 filed July 3, 1975, now U.S. Pat. No. 4,100,896; which is a division of Ser. No. 293,377, filed Sept. 29, 1972, now U.S. Pat. No. 3,893,434. The disclosures of each of the aforementioned parent applications are incorporated by reference in the present application.

FIELD OF INVENTION

This invention relates to sonic dispersion systems generally, and more particularly, to the use of a sonic dispersion system to disperse various materials such as fuels and fuel mixtures.

BACKGROUND OF THE INVENTION

Conventional fuel systems for internal combustion engines are unable to produce consistant molecular suspensions or emulsions of fuel molecules in the air stream drawn into the carburetor, and large droplets of fuel carried by the air stream into the engine cause inefficient and incomplete fuel combustion within the engine. Therefore, numerous attempts have been made to develop fuel feed systems and carburetor systems which effectively feed liquid fuel at all engine speeds while maintaining a desirable air-fuel ratio. These have resulted in the development of sonic and ultrasonic carburetor systems to achieve intensive atomization of fuel, and these systems have been employed in an attempt to achieve an even dispersion of liquid fuel in the combustion air stream. However, previous sonic or ultrasonic mechanisms have failed to operate effectively within the varying conditions present in the carburization system of an internal combustion engine.

Sonic fuel atomization systems have generally taken two forms. The first such form involves the use of vibrating nozzles through which fuel is directly injected into the airstream of an engine or into some other engine location, such as engine cylinders. U.S. Pat. No. 4,132,203 to D. G. Elpern et al provides a good example of a vibrating nozzle for creating a fuel spray. However, vibrating nozzles have proven ineffective for two reasons. First, if the vibrating nozzle malfunctions, the total fuel system for the engine ceases to operate. Either no fuel is provided to the engine, or a stream of unatomized fuel is fed into the airstream which floods the engine. Secondly, it has been found that the degree of atomization from such vibrating nozzles is somewhat uncontrollable due to a "skating effect" which occurs. When fuel is directed through or across a vibrating unit as opposed to being directed against the unit, a vapor barrier cushion forms and causes unatomized fuel to rapidly move across the active area. This "skating" phenomena exists especially during acceleration transients occurring with an engine using the fuel system.

A second form of sonic fuel atomization system includes a single fuel nozzle which directs fuel against the flat, inclined active surface of a sonic transducer. Although in these systems the fuel is directed so as to impinge to some degree against the active surface of the transducer, the fuel is still not effectively atomized. First, the fuel stream is generally directed at an angle toward the point where the fuel ultimately exits the active surface, so no substantial redirection of the fuel stream is accomplished by the active surface. Secondly, a vapor barrier cushion is formed on the flat active surface, particularly when the fuel is directed against the surface at an angle substantially parallel to the direction of fuel movement across the active surface. In fact, the velocity of the fuel striking the active surface in the direction of fuel flow across the active surface enhances the "skating effect" caused by the vapor barrier, and a large volume of unatomized fuel results.

The problems experienced by the use of conventional sonic fuel atomization systems for normal petroleum fuels are multiplied when these systems are employed as sonic dispersion units for synthetic fuels and other mixtures of solids and liquids. The recent development of synthetic fuels and fuel additives and the desire to use these synthetic fuels in furnaces, conventional internal combustion, diesel and turbine engines, and otherwise as a substitute for petroleum fuel has created a need for a very effective emulsifier. Synthetic fuels often do not burn as well as petroleum fuel, and consequently it is critical that these fuels be thoroughly atomized at a point closely adjacent the point of combustion. In instances where synthetic fuels are mixed with petroleum fuels, it is generally impractical to premix the fuel components in a common supply tank. Not only do some synthetic fuels fail to mix well with petroleum fuels in situ, but it is often desirable to alter the ratio of the mixture in accordance with the operating condition of the fuel receiving unit. For example, if an engine is being fueled, it is important to mix the fuel adjacent the fuel intake of the engine, to variably control the ratio of the mixture, and to effectively emulsify and mix the fuel components before they pass into the engine. It is impossible to effectively accomplish these results with sonic fuel dispersion systems which are not capable of even effectively emulsifying conventional petroleum fuel.

OBJECTS OF THE INVENTION

It is a primary object of the present invention to provide a novel and improved sonic dispersion unit including a dispersion surface terminating at an apex. A material injection assembly is positioned to direct material against the dispersion surface so that the material is redirected over the apex.

Another aspect of the present invention is to provide a novel and improved sonic dispersion unit having a plurality of injectors for directing different materials against a dispersion surface. The dispersion surface is inclined to form a central apex at the outer extremity thereof, and the materials injected against the dispersion surface are atomized thereby and mix at the apex. The injectors are adapted to direct the material against the dispersion surface so that the material is redirected by the inclination of the dispersion surface to the apex.

A further aspect of the present invention is to provide a novel and improved sonic dispersion unit which may be effectively incorporated into a wide variety of combustion units to provide an emulsified fuel-air dispersion to such units.

Another object of the present invention is to provide a novel and improved sonic dispersion unit which may include one or more injectors for injecting material against a dispersion surface. The dispersion surface is inclined to form a central apex and is mounted on a support unit which defines the path for an airstream to move past the apex. The apex is normally offset relative to the center of the airstream, and an airstream diverter is provided to move the path of the airstream relative to the apex. The dispersion surface is mounted so that the apex is positioned to point toward the center of the airstream.

A still further object of the present invention is to provide a novel computer controlled sonic dispersion system which is adapted to provide a mixture of two materials in varying ratios. The system is adapted to sense varying conditions in the unit receiving the material mixture and to vary the ratio of materials within the mixture in accordance with such varying conditions.

An additional object of the present invention is to provide a sonic dispersion unit capable of operating in high temperature environments. The sonic dispersion unit includes a dispersion surface for receiving a stream of material to be dispersed and a cooling conduit means for bringing fluidized material into heat transfer relationship with the dispersion surface.

Another object of the present invention is to provide a sonic dispersion unit having fuel injection nozzles which may be adapted to direct one or more fuel streams at different points on an active sonic horn and at different angles relative to the central axis of the sonic horn.

Yet another object of the present invention is to provide a sonic dispersion unit for furnishing an emulsified fuel-air dispersion to a turbine engine. Auxiliary or bleed air drawn from the turbine air supply is used both to cool the sonic dispersion unit and to assist in the dispersion process.

These and other objects of the present invention will become readily apparent from a consideration of the following specification and claims taken in conjunction with the accompanying drawings.

DESCRIPTION OF THE PREFERRED EMBODIMENTS

Figure 1:
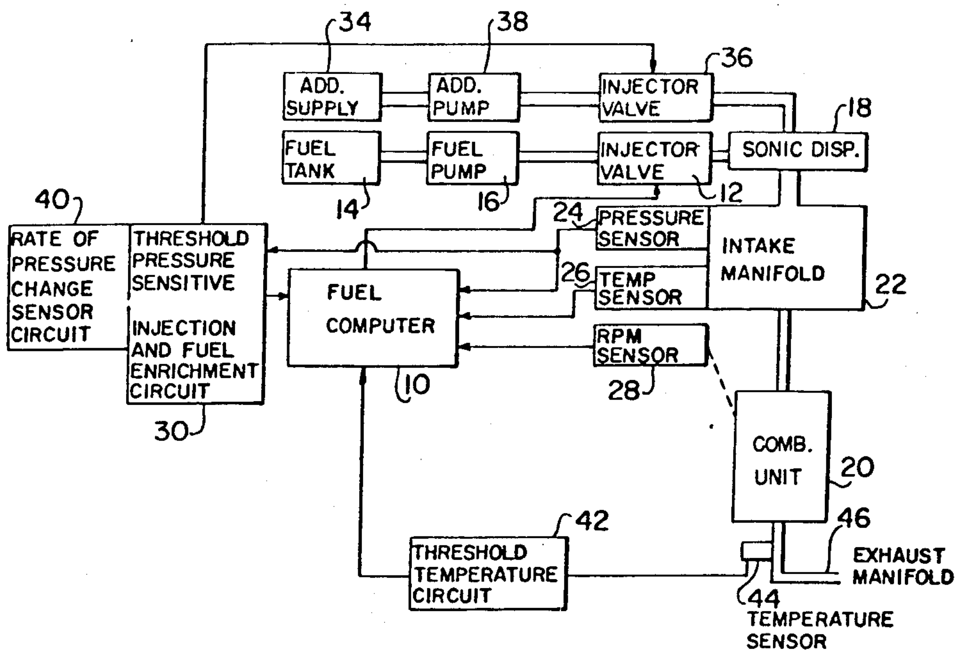
FIG. 1 is a diagram of the computer controlled dispersion system designed according to the subject invention.

FIG. 1 is a schematic illustration of a sonic dispersion system for dispersing a mixture of two materials from a plurality of supply sources. The system of FIG. 1 is a computer controlled system which is particularly adapted to provide a controlled mixture to a fuel combustion device such as a furnace or engine. This system includes a number of additions to, and modifications of, the computer controlled fuel system described in Applicants' application Ser. No. 293,377 filed Sept. 29, 1972, entitled COMPUTER CONTROLLED SONIC FUEL SYSTEM, now U.S. Pat. No. 3,893,434.

The basic purpose of the unit illustrated in FIG. 1 is to produce a computer controlled system which permits a combustion device to receive a fuel mixture which is varied in accordance with the conditions of the combustion device. If this combustion device is an internal combustion engine, it will operate on a very lean fuel/air ratio while at the same time improving performance during certain critical stages in the control of the engine such as startup, warmup and acceleration. Although a more detailed description of the operation of the fuel computer system employed in FIG. 1 is disclosed in the above noted patent, the disclosure of which is incorporated herein by reference, the operation of the basic system will be summarized briefly. Fuel computer 10 is adapted to control the operation of an injector valve 12 supplied with fuel, for example a conventional petroleum fuel, from a tank 14 by means of a fuel pump 16 so as to control the amount of fuel fed into a sonic dispersion unit 18 in response to signals representative of the operating condition of a combustion unit 20. As is illustrated in FIG. 1, the fuel/air mixture formed in dispersion unit 18 passes to combustion unit 20 via an intake manifold 22. The pressure and temperature of the fuel/air mixture within the intake manifold are sensed by a pressure sensor 24 and temperature sensor 26, respectively, from which signals representative of these respective quantities are sent to the fuel computer 10. In the case of an engine, an rpm speed sensor 28 connected with the fuel computer may also be provided for producing a signal representative of engine speed. Obviously, sensors responsive to other parameters peculiar to a particular combustion device may be employed to direct control signals to the fuel computer.

Although the computer controlled fuel system as outlined above is capable of significantly improved results over conventional mechanically controlled fuel systems, certain deficiencies in operation occur when the fuel computer is set to achieve pollution abatement and fuel economy by providing a very lean fuel/air ratio. In particular, during the startup and idle of an engine, the fuel is incompletely entrained in the airstream passing at a normal velocity through the dispersion unit since the fuel particles, even if dispersed by a special dispersion surface as disclosed in Patent No. 3,893,434, include liquid particles having a weight at least eight times greater than the air, thereby causing some of the fuel particles to impinge upon the walls of the dispersion unit instead of being entrained in the airstream passing therethrough. During normal operation, this problem is somewhat alleviated by the fact that the dispersion unit and intake manifold walls are at a sufficiently high temperature to cause vaporization of most of the components of the fuel. However, during and immediately after start-up, the walls are still cold, thereby necessitating some additional means whereby a better entrainment of the fuel may be brought about.

FIG. 1 further discloses a threshold pressure sensitive additive injection and fuel enrichment circuit 30 adapted to receive the signal produced by the pressure sensor 24 so as to produce an output signal adapted to cause additional fuel flow to the dispersion unit upon detection of a pressure within the intake manifold above a predetermined level. By this arrangement, significantly improved acceleration characteristics may be obtained when the fuel computer is adjusted to normally provide an extremely lean fuel/air ratio to the intake manifold. Of course, increased fuel flow may result in some undesirable pollutants, but this effect may be ameliorated by the provision of additive injection actuated when the pressure level within the intake manifold rises above a predetermined level to cause additive from an additive supply to be injected into the sonic dispersion unit 18 by an injector valve and additive pump. Even better results have been obtained by sensing the rate of change of pressure within the intake manifold and adding additional fuel enrichment proportional to the rate of change of pressure. As will be discussed in detail below, circuit 40 is adapted to perform this additional function.

It has further been found desirable to enrich the fuel/air ratio supplied to a combustion device 20, such as an engine, during the engine start-up and warm-up periods. A circuit adapted to accomplish this purpose is illustrated in block diagram form in FIG. 1 as a threshold temperature circuit 42. This circuit receives a signal from temperature sensor 44 mounted to sense the temperature of exhuast gases within an exhaust manifold so as to provide a signal to the fuel computer whenever the temperature from the exhaust gases is below a predetermined level.

Figure 2:
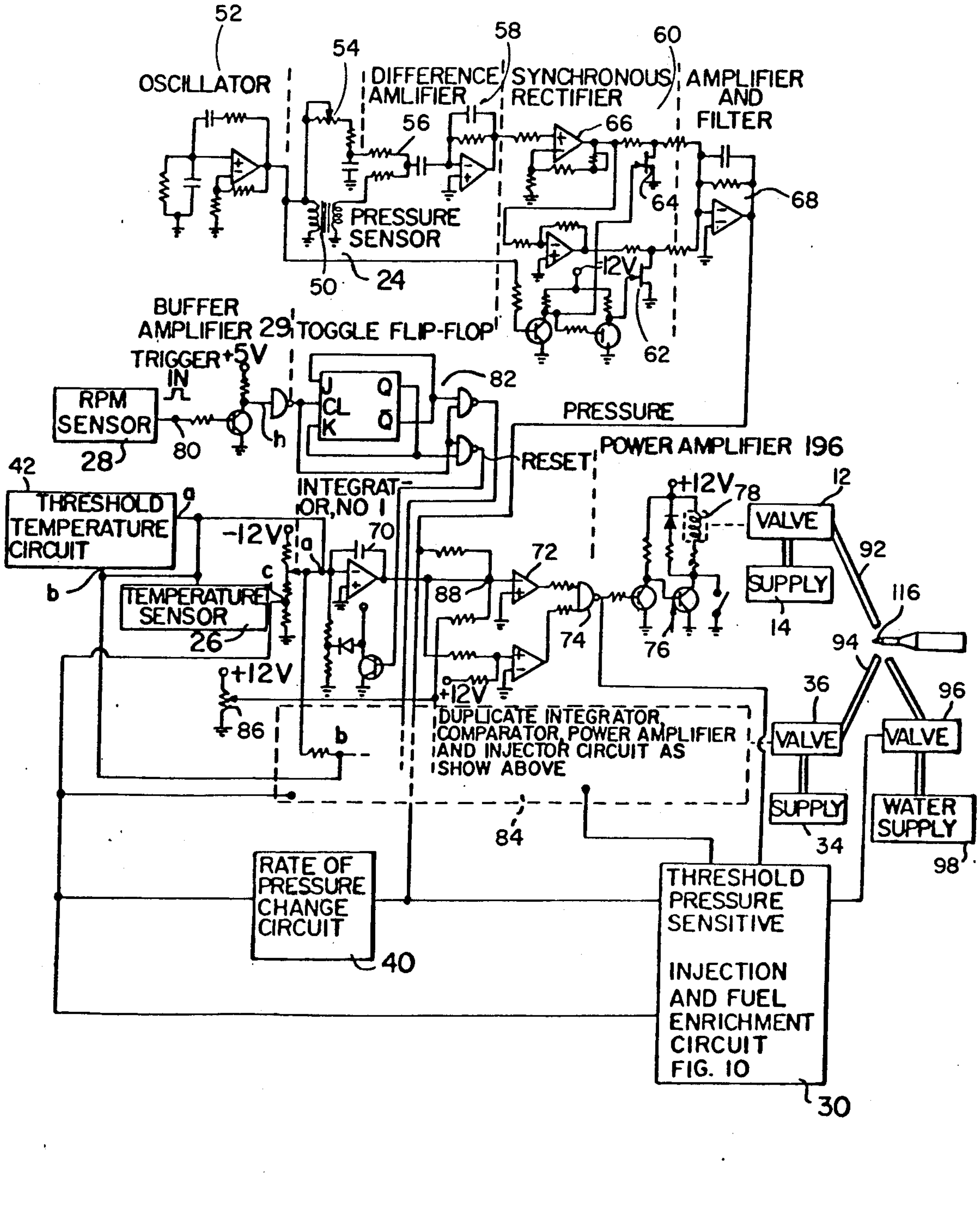
FIG. 2 is a detailed circuit diagram of the computer illustrated in FIG. 1 including the associated enrichment threshold circuitry employed in the system of the present invention.

Turning now to the circuit modifications disclosed diagrammatically in FIG. 1, reference is made to FIG. 2 wherein the fuel computer 10 of FIG. 1 is disclosed in much greater diagrammatic detail. As set forth in Pat. No. 3,893,434, computer 10 is designed to meter the proper amount of fuel to a dispersion point in accordance with sensed conditions and also to control the ratio of additive provided from an addtive supply 34. To produce optimum combustion, the fuel/air ratio should be such that the fuel is completely burned to minimize the production of carbon monoxide due to incomplete combustion and to reduce the amount of unburned hydrocarbons being admitted to the combustion byproducts. To satisfy this criteria in an internal combustion engine, the fuel/air ratio should normally be maintained at an optimal level for all similar operating conditions of the engine. Thus, while the optimal fuel/air ratio under certain operating conditions may not be the optimal ratio for other operating conditions, the fuel/air ratio should be controllable so that for any given conditions, the fuel system is capable of delivering a predetermined optimal ratio of fuel to air to the engine.

The computer 10 includes an electrical transformer 50 with a coupling between the primary and secondary windings thereof which is varied in accordance with sensed pressure. An oscillator 52, which may constitute a Wein Bridge oscillator, is coupled to drive the primary winding of the transformer 50 at a constant frequency and amplitude. The secondary winding of the transformer is polarized so that a secondary voltage is developed which is 180 degrees out of phase with that in the primary winding.

A portion of the primary voltage from the transformer primary winding is coupled through a variable zeroing circuit 54 to a resistive summing circuit 56. The summing circuit is also connected to receive the secondary voltage from the transformer secondary winding so that a portion of the primary voltage is added to the secondary voltage and the difference is amplified in a difference amplifier 58.

The output of the difference amplifier 58 is connected to a synchronous rectifier 60. It will be noted that the synchronous rectifier is also connected to receive the output of the oscillator 52, so that the synchronous rectifier rectifies the output from the difference amplifier in synchronization with the oscillator output. This is accomplished by driving two field effect transistors 62 and 64 alternatively with the oscillator output signal so as to short to ground the difference signal supplied from the difference amplifier through an amplifier 66 to a respective one of the field effect transistors when such field effect transistor is conducting.

The rectified signal output from the synchronous rectifier 60 provides a negative voltage to the input of an amplifier and filter circuit 68 if the sensed pressure is greater than the zero setting set by the zeroing circuit 54. Also, in this case, the value of the negative input voltage to the amplifier and filter circuit will become positive and will be proportional to the pressure deviation from the zero setting. The amplifier and filter circuit operates to amplify and invert the input voltage thereto as well as to filter the ripple caused by the oscillator frequency and provide an output voltage indicative of the magnitude of the sensed pressure.

The temperature sensor may consist of a thermistor having a resistance which varies inversely in response to the sensed temperature. The signal from the temperature sensor is fed to the input of an integrator 70 which is operated on a cyclic basis to integrate the signal from the temperature sensor and produce an increasing output signal which is compared to the variable pressure voltage in a comparator circuit 72. The comparator circuit operates to produce a variable width output pulse from the gate 74 which is in turn amplified in amplifier circuit 76 and connected to the operating coil 78 of the fuel valve 12. This pulse opens fuel valve 12 for a length of time dependent upon the width of the pulse from the gate 74, such pulse width being proportional to pressure and inversely proportional to temperature.

The timing of the pulse output from the gate 74 is dependent upon a trigger signal applied at a trigger input 80, and when the computer 10 is used in an engine fuel system, the input trigger signal will be derived from the rpm sensor 28. For other applications, other suitable sensors or sources of trigger pulses may be employed to provide a trigger signal to the trigger input 80. The pulses from the trigger input operate a toggle flip flop 82 to provide reset pulses for the integrator 70.

In systems where two injector units are employed to provide fuel of the same type to a sonic dispersion unit, the toggle flip flop 82 provides reset pulses to a duplicate integrator, comparator, power amplifier and injector in a duplicate system indicated in dottled lines at 84. Since the reset pulses from the toggle flip flop are provided alternatively, the valves 12 and 36 are driven in an alternative manner, so that fuel is provided to the injection nozzles alternatively.

Figure 3:
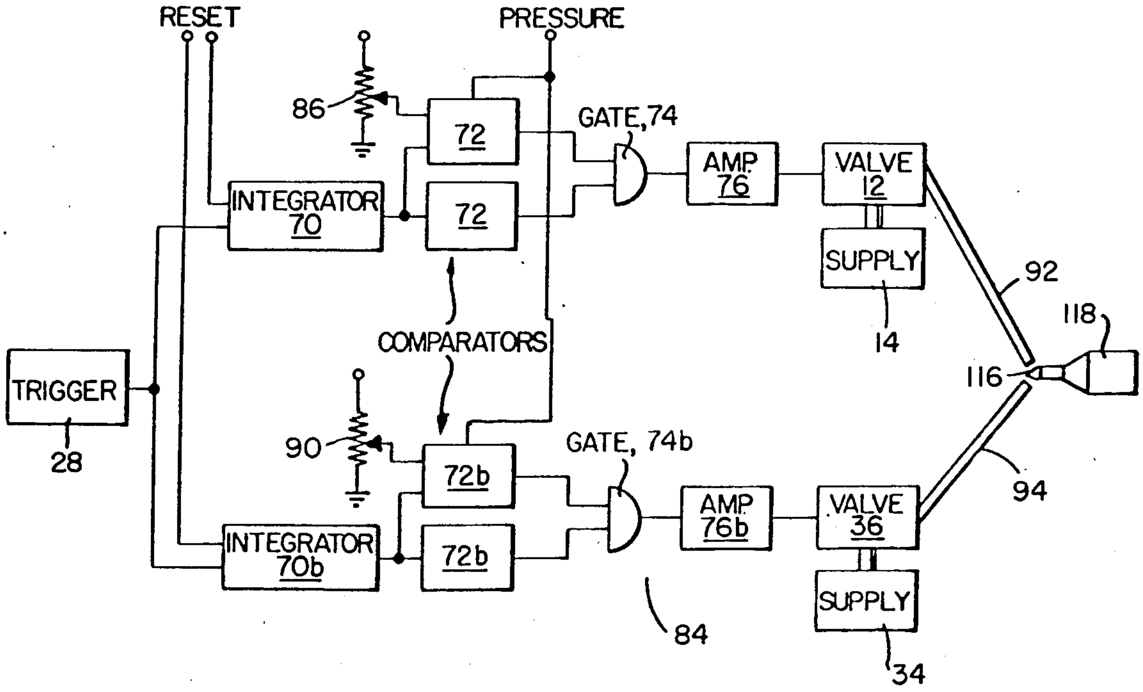
FIG. 3 is a block diagram of the computer controlled dispersion system of FIG. 2.

When several distinct substances, such as petroleum fuel and synthetic fuel, alcohol, methane, etc. are to be mixed in a controlled manner, one injector for the petroleum fuel would be controlled by the valve 12 while the synthetic fuel or other additive would pass through an injector controlled by the valve 36 and the duplicate system 84. Also, if two separate fuel substances are mixed, it is often desirable to mix these substances in some predetermined ratio. To accomplish this, an adjustable potentiometer 86 is connected to a summing pont 88, and a separate adjustable potentiometer 90 (FIG. 3) is connected in an identical manner to the duplicate system 84. In FIG. 3, the components of duplicate system 84 are designated by the reference numerals of FIG. 2 plus "b". With this structure, the duplicate system can be caused to provide a different volume of fuel substance by setting the potentiometer 90 for the duplicate system at a setting different from that set on the potentiometer 86. In this manner, the ratio of fuel components issuing from the fuel injector nozzles 92 and 94 can be varied. Even more important, however, is that either or both of the variable potentiometers 86 and 90 can constitute sensors of known type which are responsive to some condition of the combustion unit 20 or some entity associated therewith and which vary in resistance in response to this sensed condition. These sensors will then operate to automatically vary the ratio of the substances to be mixed which issue from the nozzles 92 and 94. This feature is useful when poor burning synthetic fuels or additives are being mixed with conventional fuels for an engine, for under starting, acceleration and some other engine operating conditions, it may be necessary to increase the amount of petroleum fuel and decrease the amount of synthetic fuel in the mixture.

FIGS. 1 and 2 further include a schematic representation of circuit threshold means designed in accordance with the subject invention for overcoming certain deficiencies in the performance of an internal combustion engine which may result when the engine is equipped with the subject fuel computer 10. More particularly, there is disclosed a threshold temperature circuit 42 responsive to the temperature of exhaust gases from the internal combustion engine to produce an output signal whenever the temperature of the exhaust gases is below a predetermined amount. This output signal is combined with the temperature signal from sensor 26 so as to tend to increase the amount of fuel supplied by either or both of the integrators 70 and **70*b*** when the exhaust temperature is below a predetermined level.

Also disclosed is a threshold pressure sensitive injection and fuel enrichment circuit 30 adapted to respond to a signal from the intake manifold pressure sensor 24 to produce an output signal connected with the input circuit of integrator 70 and/or the duplicate integrator **70*b* of circuit 84 so as to provide additional fuel enrichment when the pressure within the intake manifold rises above a predetermined value. This output signal may be further modified by a rate of pressure change circuit 40 which responds to the rate of change of the signal produced by the intake manifold pressure sensor 24 to produce an output signal upon the rate of change exceeding a predetermined level. The output from the rate of change circuit is combined with the output of enrichment circuit 30 so as to further increase the amount of fuel supplied during each cycle of the integrator 70 and/or its duplicate. The threshold pressure sensitive injection and fuel enrichment circuit 30 is also adapted to produce a second output signal connected to a water injection valve 96 to control the injection of water from a water supply 98. The operation and structure of the threshold pressure sensitive injection and fuel enrichment circuit 30, the rate of pressure change circuit 40, and the threshold temperature circuit 42** are completely described in the disclosure of U.S. Pat. No. 4,231,333 which is incorporated herein by reference.

Attention is now directed to FIGS. 4–8 which disclose in detail the structure of the sonic dispersion unit 18 of FIG. 1. This unit includes first and second plates 100 and 102 containing aligned apertures for forming a passage means adapted to create an airstream passage for an airstream passing into the intake manifold 22 of the combustion unit 20. A groove 104 is formed in the surface of first plate 100 facing second plate 102 and is configured to receive a slidably adjustable plate 106. Groove 104 opens into the aperture of first plate 100 so as to permit the leading edge 108 of plate 106 to move across the lateral dimension of the airstream passage formed by the apertures of first and second plates 100 and 102. The leading edge 108 is formed at an acute angle with respect to the longer side edge 110 of plate 106 to accomodate the positioning of a dispersion surface and fuel injectors, although other configurations are possible. Adjustable plate 106 is spring biased by a spring element 112 toward a position in which the adjustable plate substantially covers the air passage of the sonic dispersion unit 18.

The adjustable plate 106 is connected with an air control assembly illustrated diagrammatically by a control cable 114 which is adapted to withdraw the adjustable plate 106 against the bias of a spring element 112 so as to open the air passage of the sonic dispersion unit. In this way, adjustable plate 106 performs the same function as a butterfly throttle plate in a conventional carburetor when the dispersion unit is used with an engine and the cable 114 is connected to a throttle control assembly. The configuration and use of a plate such as adjustable plate 106 provides an important additional function, however, which is to laterally divert the airstream passing through the airstream passage. By performing this function, the adjustable plate (which may be considered a movable diverter) causes a greatly improved entrainment of dispersed fuel during various operating conditions of the combustion device by controlling the diversion of the airstream from contact with a fuel dispersion surface 116 as described below. The adjustable plate is designed to insure that the greatest possible lateral distance is created between the point of fuel dispersion and the passage of the airstream through the carburetor within the constraints imposed by the size of the airstream passage when the plate is moved inwardly. As can be seen quite clearly in FIG. 4, the fuel injector nozzles 92 and 94 are mounted immediately below the first plate 100 and are directed against a dispersion surface 116 which functions to break-up and disperse the injected material in a manner which is disclosed and discussed in the disclosure of U.S. Pat. No. 3,893,434 incorporated herein by reference. Surface 116 may be merely passive (stationary) or may be active (vibrating) when connected with a sonic energy source 118, which constitutes a one half wavelength composite horn having one quarter wavelength sections with respect to the resonant frequency of the driving transducer. In both states, the surface 116 serves to create a dispersion point which is positioned adjacent one side of the airstream passage diametrically opposite that portion of the airstream passage which is last covered by the adjustable plate 106 as it moves toward the closed position. The lateral separation of the fuel dispersion point from the airstream when the volume of air through the apertures in the plates 100 and 102 is low has been found to be extremely effective in causing complete entrainment of the dispersed fuel in the airstream as it passes into the intake manifold of the combustion device. When the combustion device is opeating such that a large volume of air passes through the apertures, the separation of the airstream from the dispersion point becomes less critical due to the higher volume of the airstream which effects more complete entrainment of the dispersed material.

Figure 5:
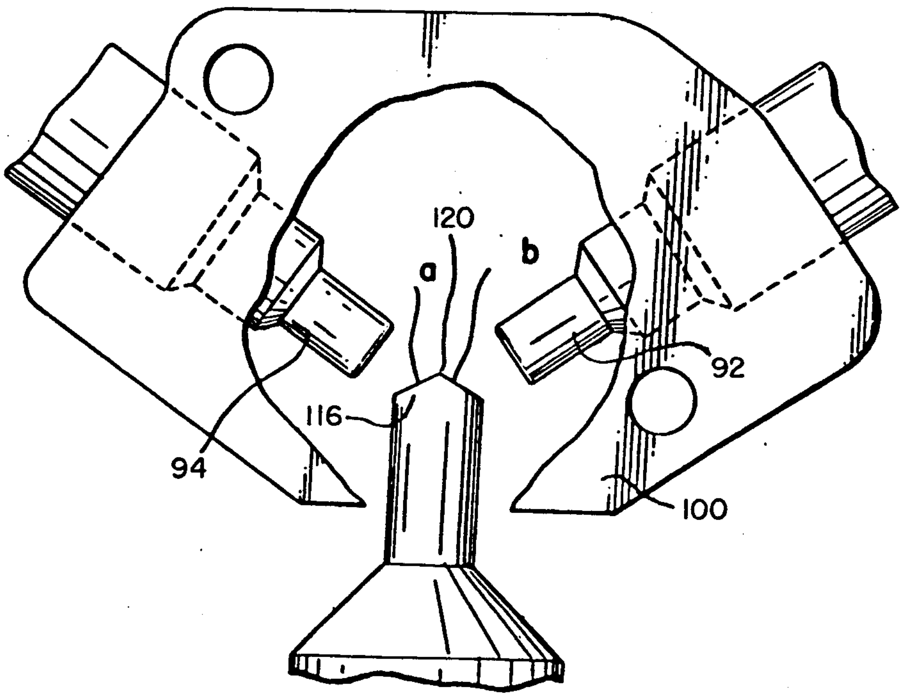
FIG. 5 is a plan view showing a second embodiment of the fuel dispersion unit of FIG. 4.

With the use of a dual injector system, it is important to note the configuration of the surface 116, for several modifications in the structure of the surface are possible. For example, as illustrated in FIG. 5, the active surface 116 may be divided into two subsections a and b, one for each fuel injector nozzle. These active surface subsections constitute flat surfaces formed at the end of a small cylindrical sonic horn section and angled to provide an apex 120 at the center thereof which is positioned to point toward the center of the airstream. The flat subsection a is positioned to receive fuel ejected from one fuel injector nozzle 94 while the flat subsection b receives fuel ejected from the remaining fuel injector nozzle 92. It has been found that the fuel injector nozzles may be placed at a number of angles with respect to an associated active surface subsection a or b, so that the force of fuel impinging upon the subsection plus the drawing force provided by the sonic vibration of the horn cause the fuel to be drawn along the active surface subsection over the apex point 120 at the end of the small cylindrical horn section. The configuration of the surface 116 in FIG. 5 is quite advantageous, for the complete active surface causes each material impulse from the injector nozzles to be atomized and directed toward the center of the airstream.

Figure 4:
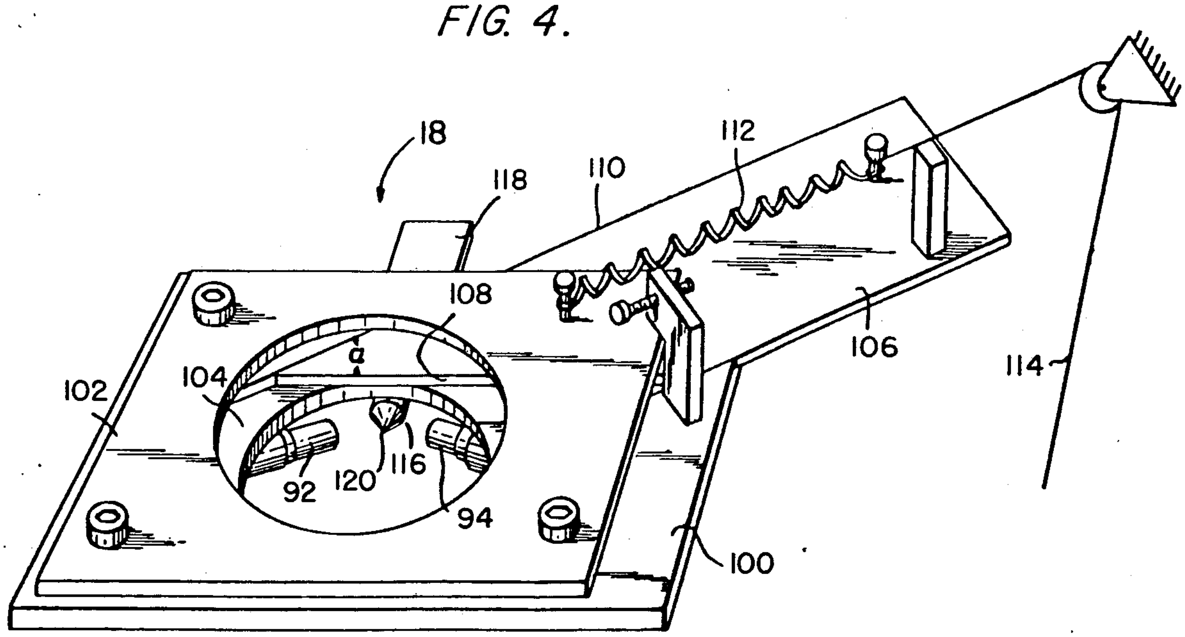
FIG. 4 is a perspective view of the sonic dispersion unit employed in the system illustrated in FIG. 1 including an adjustable plate adapted to be variably positioned across the airstream passage of the dispersion unit.

The apex 120 may constitute the terminus of a conical sonic surface 116 as shown in FIG. 4. With a conical surface, diverse materials from the injectors 92 and 94 spread evenly around the cone and mix as they are being atomized and drawn toward the apex. In the embodiments of both FIGS. 4 and 5, it will be noted that the sonic surface 116 is mounted upon the plate 100 so that the apex 120 is directed toward the center of the airstream flowing through the apertures in the plates 100 and 102. However, the apex is positioned on the periphery of the apertures so as to be offset from the center of the airstream flowing therethrough.

It should be noted that the injectors 92 and 94 are mounted on the plate 100 so as to direct a material stream in either continuous or pulsed fashion against the sonic surface 116 at an angle which is greater than ninety degrees (90°) to a longitudinal center line passing through the center of the apex 120. This causes the material stream to impact against the sonic dispersion surface 116 and to be redirected thereby toward the apex and the center of the airstream. The pressure at which material is injected toward sonic dispersion surface 116, and hence the force with which the material strikes the dispersion surface, may be varied within predetermined limits to suit the particular environment wherein sonic dispersion unit 18 is employed. Beyond a critical point, however, an increase in the pressure of the material stream will prove counter productive, inasmuch as too forceful an impact between the particles of material in the stream and the dispersion surface will essentially cancel out the effects of dispersion surface vibration and little or no redirection of the material stream will occur.

The impacting of the material stream against sonic dispersion surface 116 prevents a vapor barrier from forming on the dispersion surface and the "skating" effect which occurs when the stream is directed across the dispersion surface is eliminated. Also, with an arrangement of inclined injectors relative to a dispersion surface which angles away from an apex, material stream dispersion and emulsification will still occur to a substantial degree if the sonic system malfunctions and the dispersion surface ceases to vibrate. Impact of the material stream against the static surface 116 causes the material to be redirected toward the apex and the center of the airstream by the surface, and the material is thoroughly mixed as it passes over the apex 120.

Figure 6:
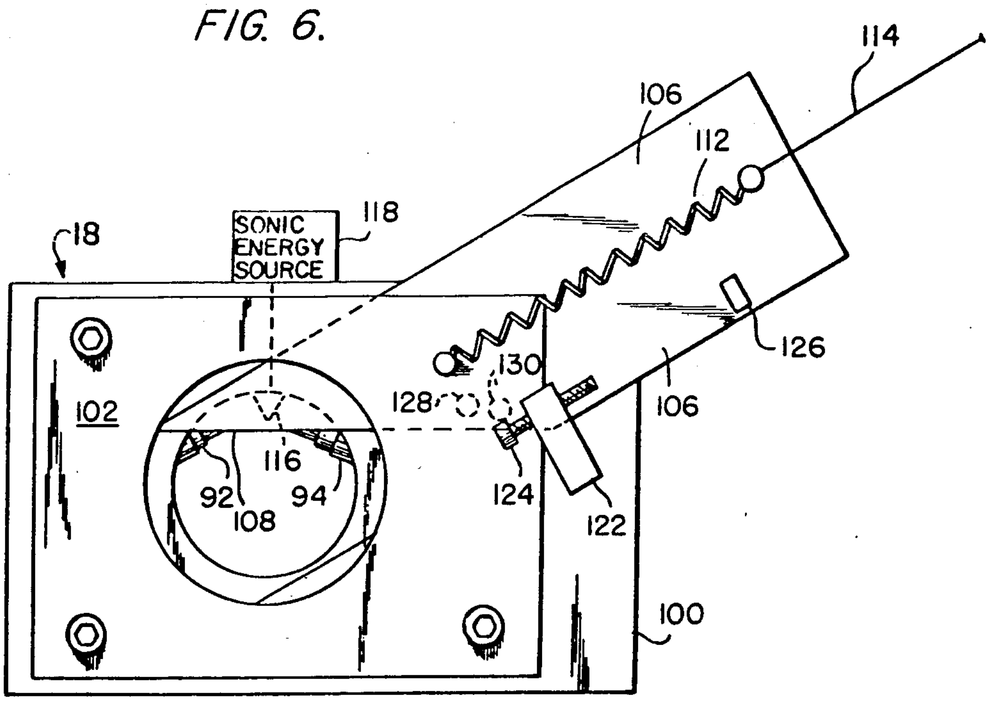
FIG. 6 is a top elevational view of the sonic dispersion unit illustrated in FIG. 4 wherein the adjustable plate is fully retracted and operates as a shroud over the injector and dispersion surface.

FIG. 6 is a top elevational view of the sonic dispersion unit 20 in which the adjustable plate 106 has been fully withdrawn for operation with a high volume of air through the apertures in the plates 100 and 102. In this position, leading edge 108 of plate 106 operates as a shroud to divert the airstream from the dispersion surface 116 and injector nozzles in the same manner as the stationary shroud disclosed in U.S. Pat. No. 3,893,434. Note that the dispersion unit 18 may be provided with an adjustable stop 122 for permitting the position of the adjustable plate 106 to be predetermined by means of a set screw 124 and stationary stop 126 mounted on plate.

Figure 7:
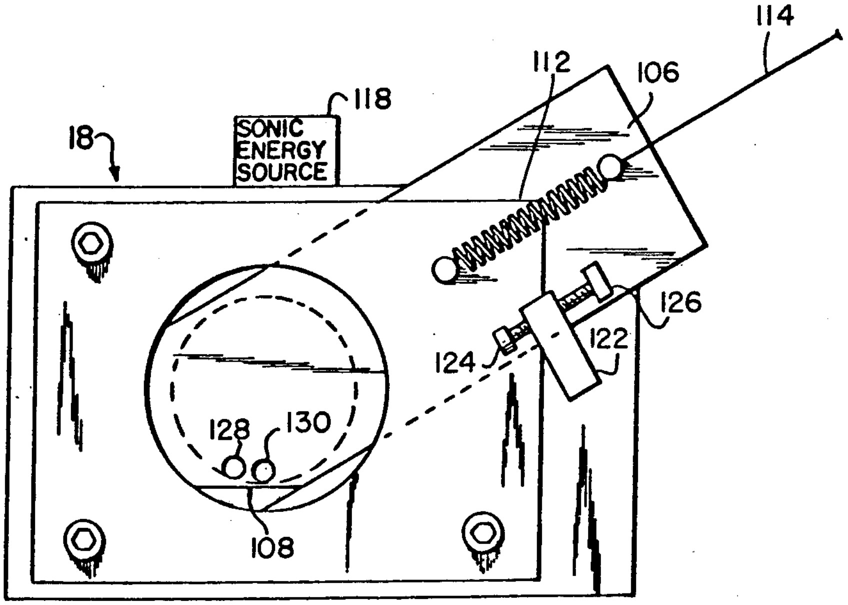
FIG. 7 is a top elevational view of the sonic dispersion unit according to the subject invention wherein the adjustable plate has been moved to a closed position adapted to bring the airstream controlled thereby to a position remote from the dispersion surface.
Figure 8:
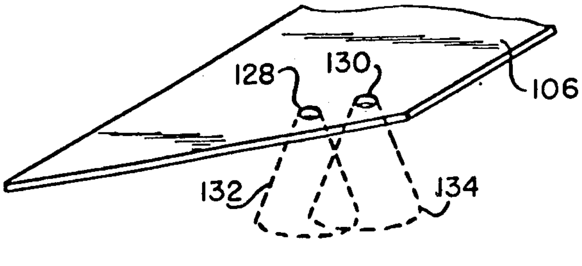
FIG. 8 is a perspective view of the adjustable plate illustrated in the previous figures wherein the air flow pattern created by a pair of apertures formed in the adjustable plate is illustrated.

FIG. 7 discloses the configuration of the sonic dispersion unit 18 when the adjustable plate is in the closed position for low airstream volumes. The leading edge 108 of the adjustable plate 106 is provided with a pair of apertures 128 and 130 located diametrically opposite the apex dispersion point 120, thereby placing the maximum lateral distance between the dispersion point and the airstream passing through the sonic dispersion unit during low airstream volume conditions. As more fully disclosed in FIG. 8, apertures 128 and 130 create a pair of cone shaped airstream patterns 132 and 134 having their apexes located within apertures 129 and 130, respectively. Apertures 128 and 130 have a small area cross section so as to insure a high velocity airstream even at very low airstream volumes and speeds. Of course, the number of apertures is not critical since a single aperture or multi-aperture may be employed, although a pair of apertures has been found to give the best results.

Figure 9:
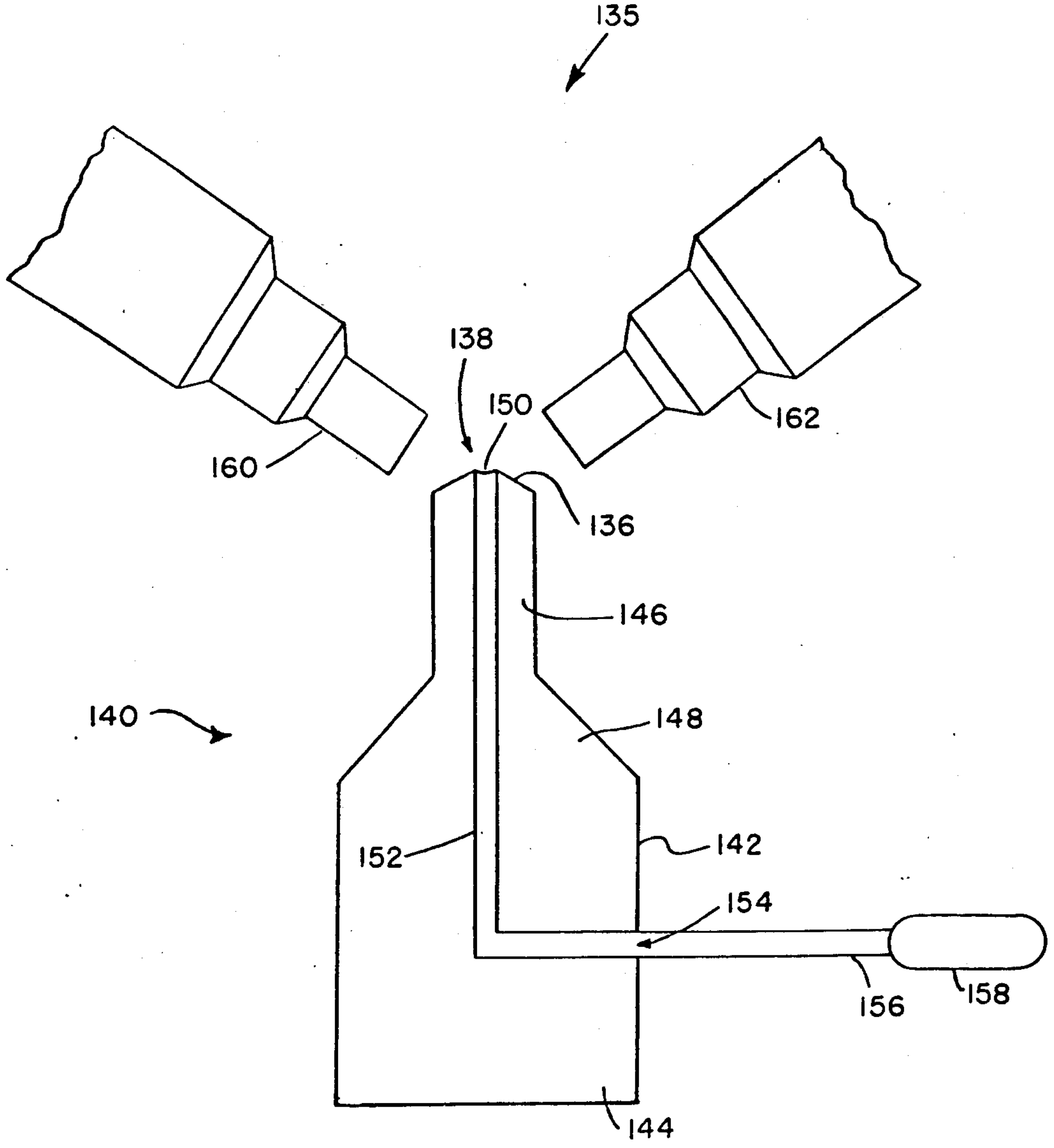
FIG. 9 is a plan view of a modified sonic dispersion unit designed for use in high temperature environments.

Under certain circumstances, the fuel dispersion unit of the present invention may be employed in high temperature environments. It is accordingly desirable to provide some means for cooling the dispersion surface and associated sonic energy source during fuel dispersion operations. FIG. 9 illustrates such a means installed in a fuel dispersion unit 135 having a sonic dispersion surface 136 with an apex 138 at the center thereof. Sonic dispersion surface 136 is connected to a sonic energy source 140 which, as disclosed in U.S. Pat. No. 3,893,434, includes a power concentrator 142 driven by a sonic transducer (not shown). The power concentrator is constructed as a one half wavelength composite horn having substantially one quarter wavelength sections with respect to the resonant frequency of the transducer. To this end, the power concentrator comprises a first enlarged cylindrical portion 144, a second small cylindrical portion 146 which terminates at sonic dispersion surface 136, and a tapered or conical portion 148 joining the enlarged and small cylindrical portions 144 and 146. Enlarged cylindrical portion 144 alone constitutes a first one quarter wavelength horn section while small cylindrical portion 146 and conical portion 148 together constitute a second one quarter wavelength horn section to provide a total one half wavelength composite horn structure. It is nevertheless to be understood that composite horn sections could be designed with other geometries having lengths which are other multiples of the transducer resonant frequency wavelength.

A fluid outlet 150 formed in sonic dispersion surface 136 communicates via conduit 152 with a fluid inlet 154 formed in enlarged cylindrical portion 144. A fluid supply tube 156 in turn connects fluid inlet 154 with a fluid source 158 containing a supply of pressurized air or other fluidized material. Preferably, fluid outlet 150 is positioned at the apex 138 of sonic dispersion surface 136. Conduit 152 may be fabricated from a non-sound absorbing material to minimize interference with the sonic activity of power concentrator 142. Sonic interference may also be reduced as disclosed in U.S. Pat. No. 3,893,434 by locating fluid inlet 154 in an area of enlarged cylindrical portion 144 where a sonic null occurs.

Two fuel injection nozzles 160 and 162 angularly oriented relative to sonic dispersion surface 136 supply fuel for dispersion in a manner analogous to that disclosed in connection with FIGS. 4–8. Thus, the two injection nozzles function to direct a material stream toward sonic dispersion surface 136 at an angle which is greater than ninety degrees (90°) with respect to a longitudinal center line passing through the center of apex 138. The material stream subsequently impacts against the sonic dispersion surface and is thereby redirected toward and beyond the apex to furnish the desired fuel air mixture or emulsion. In contrast to the operation of FIGS. 4–8 embodiments, however, an additional stream of air or other fluidized material in the FIG. 9 embodiment flows under suitable pressure from fluid source 158 through fluid supply tube 156 and conduit 152 and exits from fluid outlet 150 to mix with the emulsified fuel in the vicinity of apex 138. Heat transfer between the surfaces of power concentrator 142, sonic dispersion surface 136, and the fluidized material flowing through conduit 152 serves to cool the power concentrator, hence providing a margin of safety for the fuel dispersion unit in high temperature environments. Heat absorbed by the fluidized material is dissipated throughout the emulsified fuel mixture to assist in the vaporization of the fuel. It can also be seen that the stream of fluidized material flowing from fluid outlet 150 acts as a source of momentum, propelling the fuel particles of the emulsified fuel mixture in an ordered fashion away from apex 138 and contributing to a more thorough mixing between the particles. In this regard, the pressure in fluid source 158 can be adjusted to control the amount of mixing.

Figure 10:
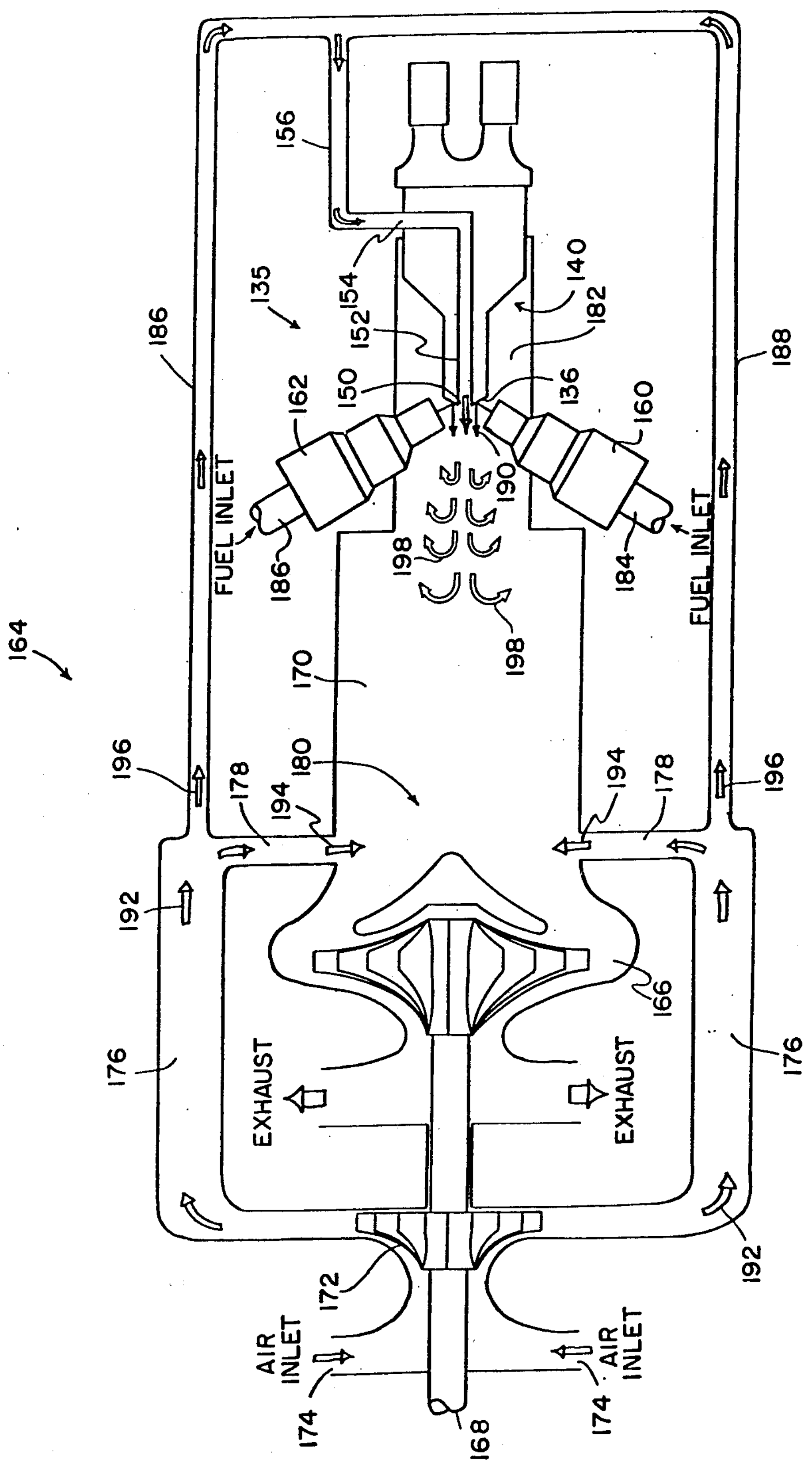
FIG. 10 is a schematic view illustrating the installation of the sonic dispersion unit of FIG. 9 in a turbine engine.

As illustrated in FIG. 10, the fuel dispersion unit of FIG. 9 may be utilized to advantage in a high temperature turbine engine such as turbine engine 164. Turbine engine 164 includes a power turbine 166 mounted on a shaft 168 at one end of a combustion chamber 170. Turbine engine 164 also includes a compressor turbine 172 mounted on shaft 168. The compressor turbine is positioned intermediate air inlets 174 and an air supply plenum 176 which surrounds the power turbine. Combustion air supply passages 178 connect the air supply plenum 176 with the combustion chamber 170 in an area 180 adjacent the power turbine. Fuel dispersion unit 135, including sonic dispersion surface 136, sonic energy source 140 and fuel injections nozzles 160 and 162, is secured within a cavity 182 at the end of combustion chamber 170 opposite the power turbine. Fuel injection nozzles 160 and 162 receive fuel from a fuel source (not shown) via conduits 184 and 186. Bleed air passages 188 branch from air supply plenum 176 to connect with fluid supply tube 156, which fluid supply tube in turn connects with the fluid inlet 154 of sonic energy source 140.

During turbine operation, fuel injection nozzles 160 and 162 direct a stream of fuel onto fuel dispersion surface 136, whereupon the fuel stream is redirected toward combustion chamber 170 along the path indicated by arrows 190. Air for combustion is drawn through air inlets 174, compressed by compressor turbine 172, and channeled into air supply plenum 176 along the path indicated by arrows 192. The bulk of the compressed air in the air supply plenum then flows through combustion air supply passages 178 into combustion chamber 170, as indicated by arrows 194, and mixes with the fuel emulsion from fuel dispersion unit 135 to form a rich, flammable air fuel mixture in area 180 of the combustion chamber. A small amount of air simultaneously enters bleed air passages 188 from air supply plenum 176 along the path indicated by arrows 196 and continues to flow through fluid supply tube 156, fluid inlet 154, conduit 152 and fluid outlet 150 to cool the fuel dispersion unit as described in connection with FIG. 9. The velocity differential between the air exiting from fluid outlet 150 and the fuel redirected from sonic dispersion surface 136 produces toroidaltype mixing currents 198 which enhance the dispersion of fuel particles introduced into combustion chamber 170. The magnitude of this velocity differential, and thus the corresponding magnitude of mixing currents 198 can be adjusted by using suitable orifices or flow restriction devices (not shown) to control the air pressure in bleed air passages 188.

The fuel injectors 92 and 94 of FIG. 5 or the injectors 160 and 162 of FIG. 9 may be beneficially repositioned relative to the sonic energy source or horns 118 and 142. Altering the relative position of the injectors provides resultant variation in the dispersion pattern and velocity emitted from the dispersion surfaces 116 and 136, and such variation is beneficial for different environments. For purposes of description, the effect achieved by varying injector postion and angle relative to the sonic horns will be described with relation to the fuel injectors 92 and 94 of FIG. 5, but the fuel injectors 160 and 162 of FIG. 9 may be mounted and operated in a similar manner.

With reference to FIG. 5, it should be noted that the angle between the incoming material stream and the longitudinal center line passing through apex 120 may be decreased to 90° or less as previously indicated without departing from the scope of the present invention, and such decreases in angle are often necessary to achieve desirable or optimum patterns of material dispersion under various operating conditions. In fact, as long as injectors 92 and 94 remain inclined relative to dispersion surface 116, and as long as neither injector blocks the path of the dispersed particles leaving surface 116, the material stream can be successfully oriented at an angle relative to the longitudinal center line passing through the apex.

Figure 11:
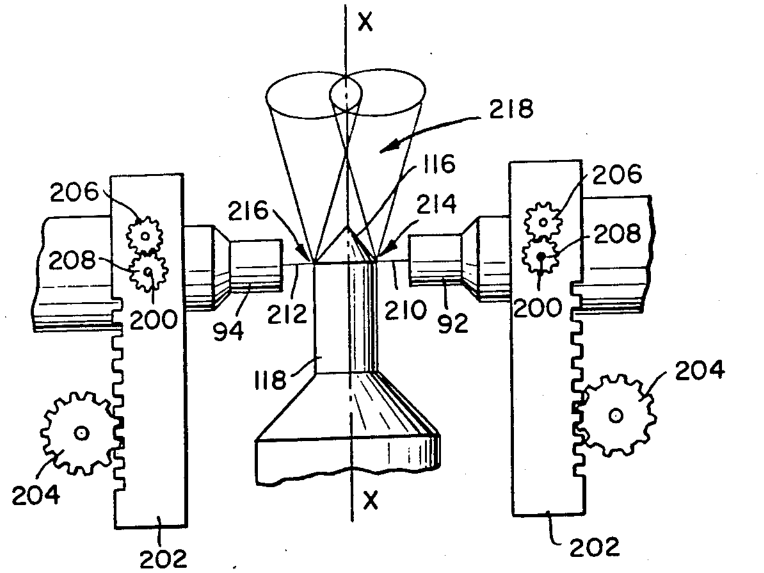
FIG. 11 is a plan view of a third embodiment of the fuel dispersion unit of FIG. 4.
Figure 12:
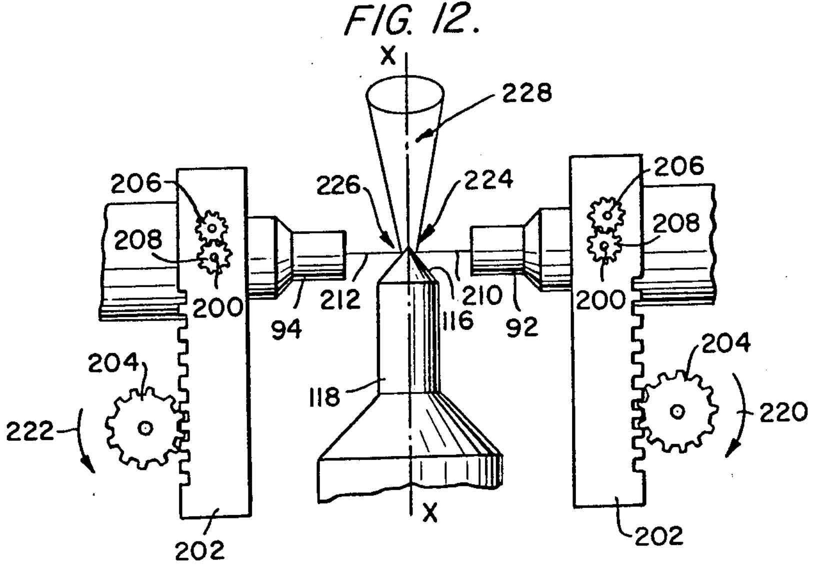
FIG. 12 is a plan view of the fuel dispersion unit of FIG. 11 with fuel injectors repositioned along the longitudinal axis of the sonic horn.
Figure 13:
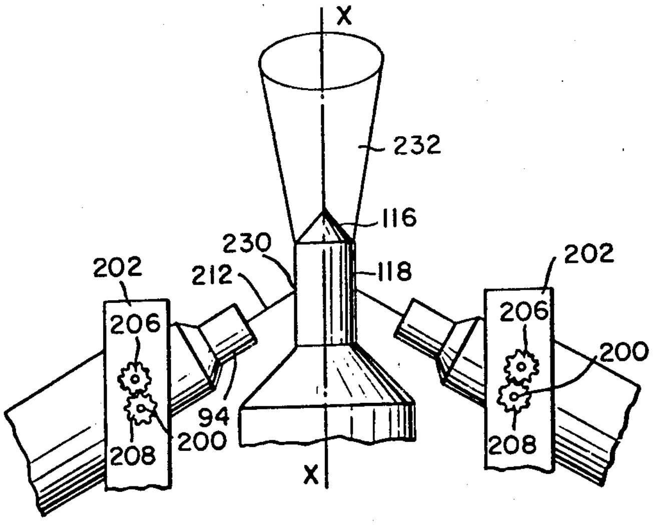
FIG. 13 is a plan view of the fuel dispersion unit of FIG. 11 with fuel injectors positioned at an angle to the longitudinal axis of the sonic horn.

Some dispersion pattern control can be obtained by shifting the injectors in a direcion parallel to the apex center line. One type of mechanism for accomplishing both angular reorientation and shifting of the injectors is illustrated in FIGS. 11, 12 and 13. Turning first to FIG. 11, each injector 92 and 94 is pivotally mounted via a pin 200 to a rack 202 which is selectively moved parallel to the center axis X-X of the horn 118 by a pinion 204. A gear 206 driven by a control motor (not shown) meshes with a gear 208 on the end of pin 200 to rotate the pin, and thus the associated injector 92 or 94, through a desired angle relative to centerline X-X. The injectors 92 and 94 have also been positioned by the associated rack 202 and pinion 204 such that the material streams 210,212 respectively impact on dispersion surface 116 at points 214,216 near the base thereof. As a result, relatively little mixing occurs between the material dispersed on opposite sides of surface 116 and a wide, dual-conical dispersion pattern 218 is produced. On the other hand, when a narrower dispersion pattern is desired, pinions 204 are rotated in the direction of arrows 220 and 222 to operate racks 202, thereby shifting injectors 92 and 94 upward as indicated in FIG. 12. The material streams 210 and 212 now respectively impact at points 224 and 226 near the apex of dispersion surface 116 to promote greater mixing between the dispersed particles of material on opposite sides of the surface, thereby producing a correspondingly reduced singular-conical dispersion pattern 228.

When both injectors 92 and 94 are injecting the same material, movement of the injectors toward the points 214 and 216 produces a wide dispersion pattern, while movement of the injectors toward the points 224 and 226 narrows the dispersion pattern while increasing the outward distance that the dispersion pattern extends.

In FIG. 13, the injectors 92 and 94 are positioned to direct a stream of material against the side of the cylindrical section of the sonic horn 118 inwardly from the active surface 116. This results in a somewhat irregular dispersion pattern, but the atomized particles are thrown off the horn active surface with greater velocity then when the material stream is directed against the active surface. The positioning of the injectors as shown in FIG. 13 may be particularly advantageous for turbine applications or other application where a high heat environment exits.

It is important that a stream of fluid or other material be projected from the injectors 92 and 94 for most applications, as a stream contacting the horn 116 will atomize more effectively than a spray. Also, a stream will be redirected by the active surface 116 in the event that the horn 118 fails to operate.

The sonic dispersion system of FIGS. 5, and 11–13 has been found to operate effectively to homogenize liquids and may be employed to both homogenize and destroy bacteria. Under test, it has been found that liquids containing bacteria or other microorganisms may be injected against the sonic horn 118 or the active surface 116 to disperse the bacteria or microorganisms within the liquid sample. In some instances, the microorganisms or bacteria are destroyed by subjecting them to high frequency sonic vibration, and in all cases, the bacteria are broken up and dispersed throughout the atomized liquid eminating from the sonic horn. If this liquid is immediately recaptured and heated or is projected by the sonic horn directly into a heated environment, the resultant pasteurization process is much more effective, for the dispersed bacterial or microorganisms are more readily destroyed.

INDUSTRIAL APPLICABILITY

The sonic dispersion system of the present invention is readily adaptable for a wide variety of uses wherein the emulsification or mixing and emulsification of substances is required. Not only is the system particularly suited for use as a fuel control system for internal combustion, diesel and turbine engines, but it is apparent that the system may be easily adapted for use as a fuel control and/or mixing unit for any combustion device. For example, the computer could be employed in combination with the sonic dispersion unit 18 to provide fuel to a furnace. In this case, temperature and pressure sensors would probably be used in connection with a pulse input which, instead of RPM, would indicate some furnace condition, such as the speed of the furnace blower. In this instance, a variable oscillator of some type might be employed to provide the pulse input to the computer 10, but for other applications, a fixed oscillator or pulse generator could be used.

It is even conceivable that only the sonic dispersion unit 18 may be included in a use device in combination with other means for controlling the operation of the injector valves 12 and 36. For example, in a paint mixing device, one injector valve might be used to control the ratio of pigment mixed with the paint passing through the remaining injector valve. Also, the sonic dispersion unit has been found to be useful for the dispersion and elimination of microorganisms in a fluid medium, particularly in conjunction with a pasteurization process.

We claim:

1. A turbine assembly comprising a combustion chamber, turbine means mounted for communication with said combustion chamber, air supply means connected to supply air to said combustion chamber, a fuel source, and sonic dispersion means mounted to be spaced from said turbine means by said combustion chamber for receiving fuel from said fuel source and for providing a fuel dispersion to said combustion chamber, said sonic dispersion means including an active, vibrating fuel dispersion surface means for forming a fuel dispersion, cooling means connected to receive air from said air supply means, said cooling means including an air supply conduit in said sonic dispersion means for supplying and directing air to cool said fuel dispersion surface means, and fuel directing means mounted in spaced relationship to said fuel dispersion surface means, said fuel directing means receiving fuel from said fuel source and directing a stream of fuel under pressure against said fuel dispersion surface means, said fuel dispersion surface means being angularly oriented so that fuel directed against said fuel dispersion surface means is redirected thereby into said combustion chamber, said cooling means including said air supply conduit further directing air at a velocity which differs from the velocity of said redirected fuel dispersion to produce mixing currents therein.

2. The turbine assembly of claim 1 wherein said fuel dispersion surface means has an outermost end terminating in a central apex which is oriented in the direction of said combustion chamber, and said fuel directing means includes fuel injection means for directing said stream of fuel under pressure against said fuel dispersion surface means, said fuel dispersion surface means being angularly oriented relative to said fuel injection means such that said stream of fuel directed against said fuel dispersion surface means is redirected thereby toward said apex, and said cooling means includes a conduit means for conducting air from said air supply means through said sonic dispersion means and a fluid outlet from said conduit means formed in said fluid dispersion surface means.

3. The turbine assembly of claim 2, wherein said fluid outlet is formed in said apex.

4. The turbine assembly of claim 2, wherein said sonic dispersion means includes a transducer means with an active surface for producing sonic wave energy and a power concentrator means secured to said active surface of said transducer means, said power concentrator means having an elongate body portion extending from said fuel dispersion surface means to said active surface, said power concentrator means operating to concentrate the sonic wave energy from said active surface at said fuel dispersion surface means.

5. The turbine assembly of claim 4, wherein said conduit structure is mounted within said elongate body portion and is constructed from non-sound-absorbing material.

6. The turbine assembly of claim 5 wherein said power concentrator means is formed to provide at least one point where a sonic null occurs and an air inlet is formed on the power concentrator means at a point where a sonic null occurs and said conduit means is connected to said air inlet.

7. The turbine assembly of claim 6, wherein said elongate body portion includes a tapered section, a first, substantially cylindrical end section extending between said tapered section and said fluid dispersion surface means, and a second substantially cylindrical end section which is larger in diameter than said first end section extending between said tapered section and said active surface of said transducer means.

8. The turbine assembly of claim 7, wherein said transducer means has a resonant frequency, said second substantially cylindrical end section being formed to one quarter wavelength with respect to said resonant frequency and the combination of said tapered section and said first, substantially cylindrical end section being formed to one quarter wavelength with respect to said resonant frequency.

9. The turbine assembly of claim 8, wherein said fluid inlet is formed in said second substantially cylindrical end section.

10. The turbine assembly of claim 1 wherein said fuel dispersion surface means has an outermost end which is directed toward said combustion chamber, said fuel directing means including fuel injection means mounted in spaced relationship to said fuel dispersion surface means for directing a stream of fuel under pressure across the space between said fuel injection means and said fuel dispersion surface means to cause said fuel to impinge against said fuel dispersion surface means at a point spaced from said outermost end, said fuel dispersion surface means operating to redirect said fuel toward said outermost end and into said combustion chamber.

11. The turbine assembly of claim 10 wherein said sonic dispersion means includes a transducer means with an active surface for producing sonic wave energy and a power concentrator means secured to said active surface of said transducer means, said power concentrator means being provided with said fuel dispersion surface means and having an elongate body portion extending from said fuel dispersion surface means to said active surface, said power concentrator means operating to concentrate the sonic wave energy from said active surface at said fuel dispersion surface means.

12. The turbine assembly of claim 11 wherein said sonic dispersion means includes cooling means connected to receive air from said air supply means, said cooling means operating to direct air to cool said fuel dispersion surface means.

13. The turbine assembly of claim 1 wherein said sonic dispersion means includes cooling conduit means formed to conduct a flow of air through said sonic dispersion means to cool said fuel dispersion surface means, said cooling conduit means being connected to said air supply means.

14. The turbine assembly of claim 13 wherein an air outlet means is formed in said material dispersion surface means to direct air into the fuel being redirected into said combustion chamber, said air outlet means being formed to receive air from said cooling conduit means.

15. The turbine assembly of claim 1 wherein said combustion chamber has a first end and a second end spaced from and opposite to said first end, said turbine means being mounted for communication with said combustion chamber at the first end thereof, said turbine assembly including a fuel chamber opening into said combustion chamber at the second end thereof, said sonic dispersion means being mounted in said fuel chamber.

16. The turbine assembly of claim 12 wherein said fuel directing means are mounted in said fuel chamber between said second end of said combustion chamber and said active vibrating fuel dispersion surface means.

* * * * *